US012649367B2

(12) United States Patent
Koopsingraven et al.

(10) Patent No.: US 12,649,367 B2
(45) Date of Patent: Jun. 9, 2026

(54) DRIVE ARRANGEMENT FOR THE DISPLACEMENT OF A CONTACTING DEVICE AS WELL AS CONTACTING DEVICE AND USE THEREOF

(71) Applicant: STEMMANN-TECHNIK GMBH, Schüttorf (DE)

(72) Inventors: Jan Koopsingraven, Wietmarschen (DE); Marcel Völker, Osterwald (DE)

(73) Assignee: Stemmann-Technik GmbH, Schüttorf (DE)

( * ) Notice: Subject to any disclaimer, the term of this patent is extended or adjusted under 35 U.S.C. 154(b) by 941 days.

(21) Appl. No.: 17/909,924

(22) PCT Filed: Nov. 11, 2021

(86) PCT No.: PCT/DE2021/100901
§ 371 (c)(1),
(2) Date: Sep. 7, 2022

(87) PCT Pub. No.: WO2022/100790
PCT Pub. Date: May 19, 2022

(65) Prior Publication Data
US 2023/0398874 A1 Dec. 14, 2023

(30) Foreign Application Priority Data

Nov. 12, 2020 (DE) .................... 10 2020 129 874.9

(51) Int. Cl.
*B60L 5/26* (2006.01)
*B60L 5/10* (2006.01)
(Continued)

(52) U.S. Cl.
CPC .................. *B60L 5/26* (2013.01); *B60L 5/10* (2013.01); *B60L 5/12* (2013.01); *B60L 5/24* (2013.01);
(Continued)

(58) Field of Classification Search
CPC ...... B60L 5/26; B60L 5/28; B60L 5/30; B60L 5/10; B60L 5/12; B60L 5/24; B60L 53/35;
(Continued)

(56) References Cited

U.S. PATENT DOCUMENTS 4,413,710 A * 11/1983 Milleville ................. B60L 5/28
191/88
10,744,881 B2 * 8/2020 Gamsjäger .............. B60L 53/14
(Continued)

FOREIGN PATENT DOCUMENTS

CN        204340711          5/2015
CN        204340711 U  *  5/2015
(Continued)

OTHER PUBLICATIONS

International Search Report issued by the European Patent Office in International Application PCT/DE2021/100901 on Feb. 1, 2022.

*Primary Examiner* — S. Joseph Morano
*Assistant Examiner* — James William Jones
(74) *Attorney, Agent, or Firm* — K&L Gates LLP

(57) ABSTRACT

A drive arrangement for displacing a contacting device from a raised position to a lowered position includes a four-joint linkage having first, second and third arms interconnected such as to displace the contacting device as the first, second and third arms pivot. An actuator is connected via an actuating lever to the first arm and acted upon by a spring force which counteracts an actuating force applied by the actuator on the actuating lever. The actuating lever is pivotally connected to the first arm and supportable on the first arm via a catch when the first arm is displaced into a raised position and detachable from the first arm when the first arm is displaced into a lowered position, so that the actuating lever assumes a release position in the lowered position of
(Continued)

the contacting device, with the contacting device maintained in the lowered position by its weight force.

19 Claims, 6 Drawing Sheets

(51) Int. Cl.
| | |
|---|---|
| *B60L 5/12* | (2006.01) |
| *B60L 5/24* | (2006.01) |
| *B60L 5/28* | (2006.01) |
| *B60L 5/30* | (2006.01) |
| *B60L 53/35* | (2019.01) |

(52) U.S. Cl.
CPC .................. *B60L 5/28* (2013.01); *B60L 5/30* (2013.01); *B60L 53/35* (2019.02); *Y02T 10/70* (2013.01); *Y02T 10/7072* (2013.01); *Y02T 90/12* (2013.01); *Y02T 90/14* (2013.01)

(58) Field of Classification Search
CPC ..... Y02T 10/70; Y02T 10/7072; Y02T 90/12; Y02T 90/14

USPC ......................................................... 191/47
See application file for complete search history.

(56) References Cited

U.S. PATENT DOCUMENTS

| | | | |
|---|---|---|---|
| 2016/0167530 A1 | 6/2016 | Bolik et al. | |
| 2017/0113554 A1* | 4/2017 | Doddakula | ............... B60L 5/08 |

FOREIGN PATENT DOCUMENTS

| | | | | | |
|---|---|---|---|---|---|
| DE | 102015217380 | | 3/2017 | | |
| DE | 112019003176 | | 3/2021 | | |
| EP | 0356835 | A2 * | 3/1990 | ............... | B60L 5/28 |
| EP | 3 031 658 | | 6/2016 | | |
| ES | 2557814 | T3 * | 1/2016 | ............... | B60L 5/19 |
| JP | 2016-63558 | | 4/2016 | | |
| KR | 20130033590 | A * | 4/2013 | ............... | B60L 5/32 |

* cited by examiner

DRIVE ARRANGEMENT FOR THE DISPLACEMENT OF A CONTACTING DEVICE AS WELL AS CONTACTING DEVICE AND USE THEREOF

CROSS-REFERENCES TO RELATED APPLICATIONS

This application is the U.S. National Stage of International Application No. PCT/DE2021/100901, filed Nov. 11, 2021, which designated the United States and has been published as International Publication No. WO 2022/100790 A1 and which claims the priority of German Patent Application, Serial No. 10 2020 129 874.9, filed Nov. 12, 2020, pursuant to 35 U.S.C. 119(a)-(d).

BACKGROUND OF THE INVENTION

The invention relates to a drive arrangement for the displacement of a contacting device as well as to such a contacting device and its use.

In the prior art, current collectors, so-called pantographs, are known. It involves a kinematic system for displacing a contacting device from a lowered position to a raised position against a contact wire. However, there are also applications in which a contacting device is to be displaced from a raised to a lowered position against a counterpart.

The invention is based on the object to provide a drive device for such a contacting device with a subjacent counterpart, which drive device is suitable to interrupt the contact to the counterpart in the event of a malfunction and at the same time is designed to apply a defined contact pressure without the need for a complex control or regulation system. A corresponding contacting device and its use shall be provided.

SUMMARY OF THE INVENTION

The object is attained with a drive arrangement as set forth hereinafter. The object is also attained by a contacting device as set forth hereinafter. The use of such a contacting device for establishing an electrically conductive contact with a counterpart below the contacting device is is also disclosed as set forth hereinafter. The subclaims set forth advantageous refinements.

The drive arrangement according to the invention is provided to displace a contacting device from a raised position to a lowered position. The contacting device is designed for this purpose to come into electrically conductive contact with a counterpart at different heights. This counterpart can, for example, be a contacting device on a roof area of a motor vehicle that is to be charged in a charging station by means of the contacting device. Also involved may be, e.g., a watercraft that is to be electrically charged. Ships that are loaded and unloaded in port and are exposed to the tidal range have an almost constantly changing vertical position.

The drive arrangement includes a first arm as upper arm and a second arm as guide arm, which together with a third arm as lower arm form a four joint linkage. The lower arm includes a free lower end which carries the contacting device. By displacing the third arm by means of the first arm and the second arm within the four-joint linkage, the contacting device can be displaced to the desired raised or lowered position.

An actuator is in active engagement with the first arm via an actuating lever. The first arm is quasi the drive arm. The second arm is a guide arm to guide the third arm.

The actuating lever between the actuator and the first arm is connected for pivotal movement with the first arm. It is under the influence of a spring force to support the actuating lever in a position upon the first arm, so that the first arm is also under the influence of the spring force. The spring force can be a tensile force or a compressive force. This means that the actuating lever is either pushed against the first arm or pulled against the first arm under the influence of the spring force. The spring force counteracts the actuating force. The spring force can act on the actuating lever at the same point as the actuating force. In terms of the operating principle of the drive arrangement, the positions of the points, upon which the spring force and the actuating force act on the actuating lever, are irrelevant. For a compact design, the spring force and the actuating force may coincide at one point. If a spring is to be dimensioned smaller, this can be compensated by a greater lever arm. If, on the other hand, the actuating force is to be reduced, the actuator can be combined with a greater lever arm, i.e. the actuating force can act at a greater distance from a pivot point of the lever arm. It is generally simpler in terms of design, when the points of attack for the actuating force and the spring force are not identical, so that the spring force and the actuating force are in active engagement with the actuating lever at a distance from each other. Within the scope of the invention, the term active engagement does not mean that the spring itself must be connected to the actuating lever. The spring force can also be transmitted from the spring to the actuating lever via intermediate elements such as coupling rods, connecting elements or other suitable transmission elements. The same applies to the connection between the actuator and the actuating lever.

The counteraction of spring force and actuating force is to be understood in the sense of oppositely directed force vectors. The vector of the spring force does not necessarily have to coincide with the orientation of e.g. a helical compression spring. It is sufficient when the spring force predominantly counteracts the actuating force.

The weight force which pushes the contacting device downwards against the counterpart is intended to ensure contact with the counterpart over a very wide vertical adjustment range, without the spring force having any influence on the contacting force. It is not the spring force that pushes the contacting device against the counterpart, nor is it the actuating force. Rather, the actuator is intended to displace the actuating lever during lowering to such an extent that the contacting device quasi rests on the counterpart in a floating manner. The counterpart can change its vertical position within a very large stroke range without changing the contact force thereby. The invention therefore enables to realize an essentially constant contact pressure without complex electromechanical controls or regulations.

A certain influence of the spring force becomes effective only when the spring force acts on the actuating lever at a different point than the actuating force. Depending on the positioning or lever ratios, the spring force can partly increase and also partly reduce the contact pressure.

The spring force or a spring is primarily provided for emergency operation. An emergency occurs when the actuating lever can no longer apply any actuating force, for example because it is de-energized. In this case, provision may be made, for example, for a spindle drive to be decoupled and for the spring force to retract the spindle. Theoretically, it is also conceivable that in the event of a power failure, an emergency power source is utilized, for example by a battery to drive a spindle drive of the actuating lever in order to raise the first arm with the assistance of the spring force.

Solely by the influence of the spring force can it become possible to hold the contacting device in a raised position in which the contacting device is without contact to the counterpart. In order to displace the contacting device into a lowered position or to pivot the first arm, the actuator has the actuating force which exerts upon the actuating lever an actuating torque which is greater than a restoring torque caused by the spring force on the actuating lever. As a result, the actuating lever can be displaced from the engagement position to a release position.

The actuating lever is supportable on the first arm via a catch when the first arm is displaced to the raised position, and is detachable from the arm when the first arm is displaced to a lowered position.

In the release position, the moment generated by the weight of the contacting device dominates. Since the actuating lever is pivotally connected to the first arm, the first arm in the lowered position is largely free from the influence of the spring force and also free from the influence of the actuating force. The contacting device is pulled downwards by its own weight and rests on the counterpart by its own weight. The contact force with which the contacting device contacts the counterpart depends to a large extent on the weight force of the contacting device and the four-joint linkage arranged on it, and does not depend on the spring force.

The travel speed of the entire system, with its movement being determined by the contact of the catch with the first arm, is controlled by the speed of the actuator.

A further advantage of the drive arrangement according to the invention is to be seen in conjunction with motor vehicles, because they can raise or lower themselves in the loading position, for example by changing the load. In this operating state, the contact force of the contacting device should not increase so as not to damage the motor vehicle. At the same time, however, it may also not be reduced in order to ensure a safe energy flow and to avoid electric arcs. The contact force of the contacting device should be kept as constant as possible. This is achieved by the release position of the catch, which leads to a floating, i.e. not force-guided support in the upward direction of the contacting device upon the counterpart. The weight force with which the contacting device rests upon a counterpart is generated in particular only by the weight of the contacting device.

The catch is provided to support upon a mounting on the first arm. An adjustable spacer can be arranged on the catch or on the mounting in order to adjust the distance between the catch and the mounting. The position of the four-joint linkage can be determined in the raised position can be determined via the spacer, for example a threaded bolt.

The first arm includes a first, upper end. In the area of this end, the actuating lever is connected to the first arm in an articulated manner. The area of this first end includes in particular the area of the bearing of the first arm, which bearing is at the same time also the main bearing via which the drive arrangement and also the contacting device are held.

The second arm serves primarily as a guide arm so that the third arm or the contacting device arranged thereon executes the desired movement. The articulated connection between actuating lever and first arm is located in immediate proximity to this main bearing or to the main bearing axis of the first arm. It can also be located directly on the main bearing axis.

In the area of the first end, a bearing support for the actuating lever is preferably arranged on the first arm. The actuating lever is mounted in an articulated manner on this bearing support. The bearing support is in particular arranged on a bearing sleeve for the main bearing on the first arm. As a result, the bearing support is pivoted together with the bearing sleeve of the first arm. This bearing support can be used at the same time to support the mounting. The bearing support then has a dual function: On one hand, it serves as support for the actuating lever and, on the other hand, the forces exerted by the spring or the actuator can be transmitted via the mounting. The torque applied to raise the first arm via the actuating lever is largely determined by the distance of the bearing of the actuating lever from the main bearing and by the position of the mounting.

The actuator is preferably designed as a linear drive. This may involve an electrically driven spindle drive or also a piston and cylinder arrangement that is driven hydraulically or pneumatically.

Preferably, the actuator in the form of a linear drive acts essentially parallel to the spring force. The spring force is in particular a tensile force, since in this case the spring can be arranged in a very space-saving manner between the main bearing and the bearing point of the second arm in the uppermost region of the drive arrangement. Since the spring exerts a tensile force, a counteracting actuator must exert a compressive force, at least when both components are arranged essentially parallel next to each other.

To ensure that the actuator does not have to apply a greater moment than is generated by the spring force, the spring force preferably engages between an articulated connection of the actuating lever with the actuator and an articulated connection between the actuator and the bearing support. As a result, the lever arm of the actuator in relation to the main bearing of the first arm is greater than the lever arm of the spring in relation to the main bearing of the first arm. Depending on the position of the articulated connections and depending on the length and design of the actuating lever, the actuating force can be reduced in this manner. It is therefore quite possible that, due to the lever ratios, the actuating force to be applied by the actuator is significantly lower than the spring force acting in the opposite actuating direction. Decisive is that the force acting upwards on the contacting device due to the restoring torque in the release position is smaller than the weight force acting downwards on the contacting device.

The spring or spring force can also be arranged at a greater distance than the actuator from the articulated connection between the actuating lever and the first arm. In other words, the spring may be arranged below and the actuator above the spring, Arrangements of actuators and springs arranged side by side, as viewed in the horizontal direction, are also possible. The spring force may also be applied by multiple springs. The invention is not limited to a single spring.

In addition to a pure drive arrangement for different contacting devices, the invention also relates in particular to a contacting device with such a drive arrangement as has been explained above. The contacting device involves in particular a device for establishing an electrically conductive contact, e.g., at a stationary charging station, with a mobile counterpart, e.g. a motor vehicle.

In the practical use of a contacting device for establishing a conductive contact between the contacting device and a counterpart located below the contacting device, the actuating lever is displaced to a release position so that the counterpart is in contact with the contacting device predominantly or exclusively under the influence of the weight force of the contacting device and the arms connected thereto. The contacting device remains in this position until, e.g., a charging process is completed. The actuator then acts in the opposite direction so that the actuating lever comes again to rest upon the mounting. The actuating lever with the mounting now serves as a catch to swing back the first arm.

Resetting can be realized exclusively by the spring force, for example in an emergency situation. For this purpose, the contacting device is raised without actuation of the actuator to such an extent that the contacting device is only raised further by the spring force. In normal operation, resetting is realized in a controlled manner under the influence of the actuator.

BRIEF DESCRIPTION OF THE DRAWING

The invention will be explained in more detail hereinafter by way of exemplary embodiments illustrated in the purely schematic drawings.

It is shown in.

DETAILED DESCRIPTION OF PREFERRED EMBODIMENTS

Figure 1:
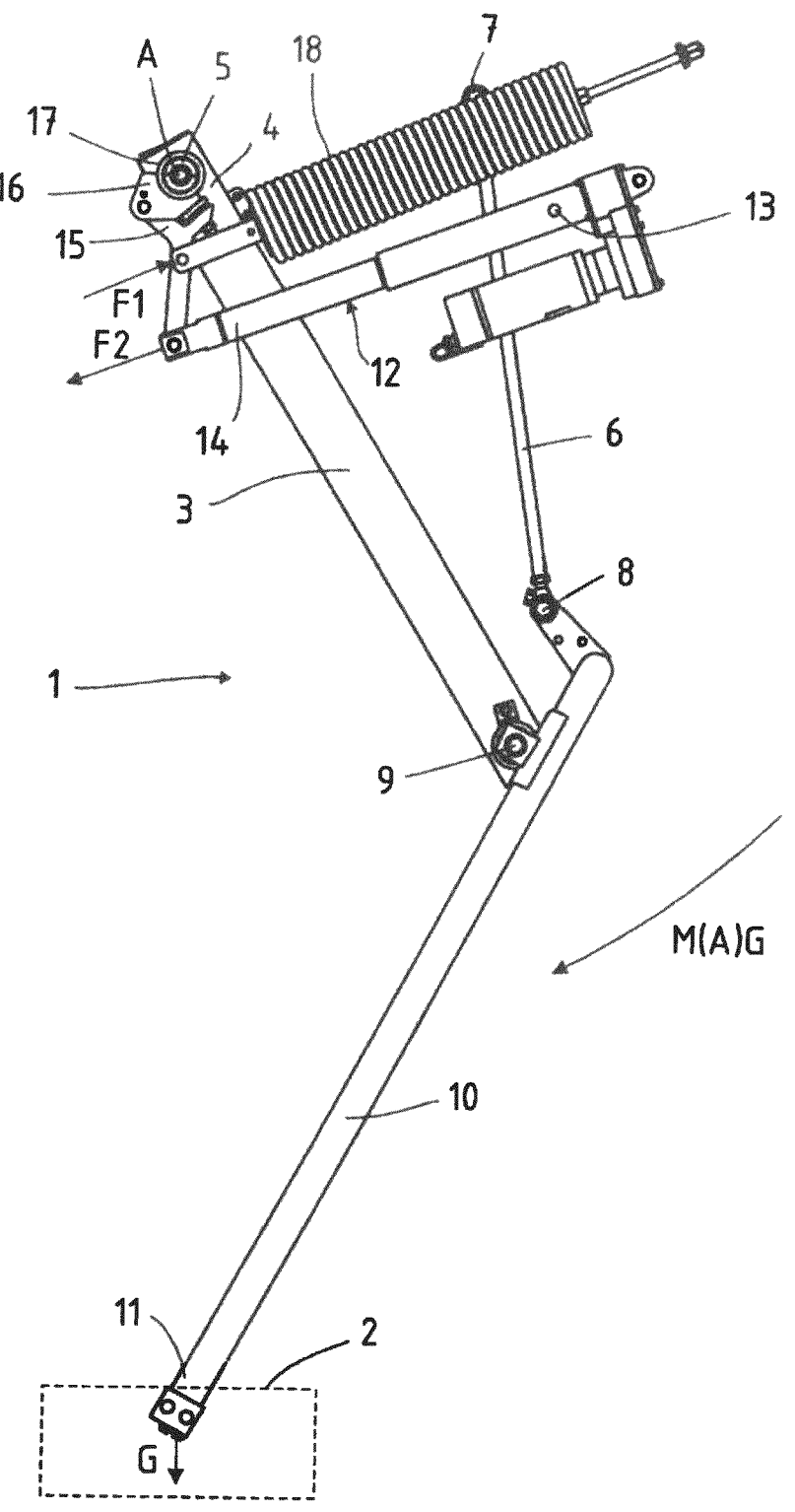
FIG. 1 a simplified illustration of a drive arrangement in a lowered position.

FIG. 1 shows a side view of a drive arrangement 1 for a contacting device 2, which is displaceable from a raised position to a lowered position as shown. The drive arrangement 1 is suspended and attached to a supporting frame, which is not shown in greater detail and is located above the drive arrangement 1. It has several arms which form a four-joint linkage. A first arm 3 is the main arm and has a main bearing 5 at its first, upper end 4. The main bearing 5 is connected to the frame in a manner not shown in greater detail. A second arm 6 has at its first, upper end a bearing 7, via which the second arm 6 is connected to the frame, and at the second, lower end a lower bearing 8. The first arm 3 also has such a lower bearing 9. Both lower bearings 8, 9 are arranged at a distance from one another and connected to one another in a pivotable manner via a third arm 10. The distance between the lower bearings 8, 9 is relatively small hi relation to the overall length of the third arm 10. As a result, a lower end 11 of the third arm 10, which lower end is connected to the contacting device 2, can be pivoted over a relatively large stroke range.

The upper bearing 7 of the second arm 6 and the main bearing 5 are stationary joints. The entire drive arrangement including the contacting device 2 is supported via these two bearings 5, 7, with the main load being borne by the first arm 3, while the second arm 6 is provided for kinematic reasons to guide the third arm 10 or the contacting device 2.

The drive arrangement 1 according to the invention includes an actuator 12. It involves a linear drive. It includes an actuating cylinder 13 in which a piston rod 14 is guided. The piston rod 14 is pivotally connected with a bearing on the actuating lever 15, with the actuating lever 15 being pivotally connected to the first arm 3 via a bearing support 16 by means of a further bearing. The bearing support 16 is connected in fixed rotative engagement with a bearing sleeve 17 of the bearing support 16, in particular welded. The bearing sleeve 17 is part of the first arm 3 and rotates about the main bearing 5 as the first arm 3 pivots. Accordingly, the angular position of the bearing support 16 with respect to the first arm 3 is the same at ail times.

The actuating lever 15 is further connected to a spring 18, which exerts a spring force F1 upon the actuating lever 15. The spring 18 and the actuator 12 are supported on the frame.

Figure 2:
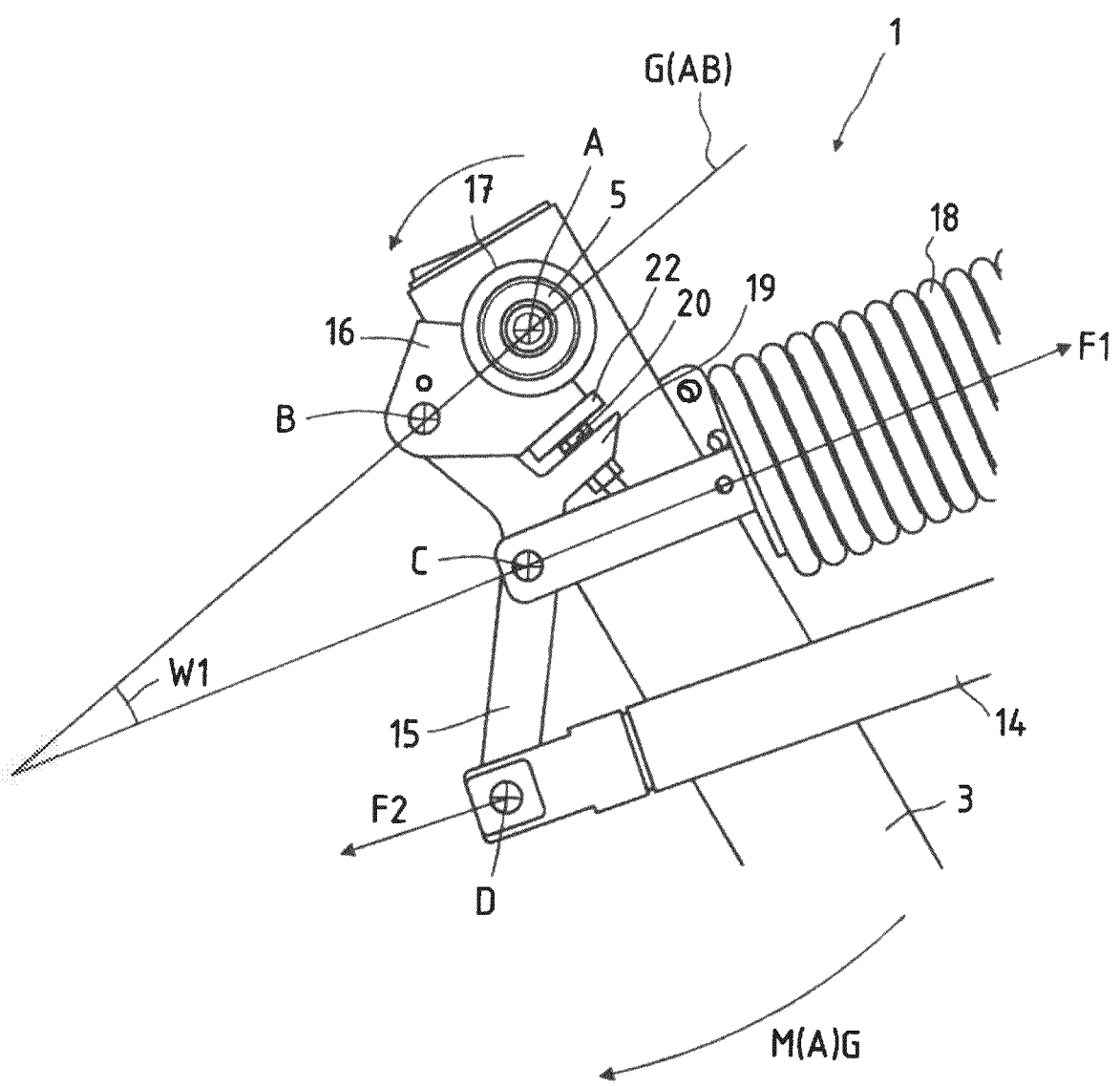
FIG. 2 a detail of the drive arrangement of FIG. 1.

The actuator 12 exerts a force F2 upon the actuating lever 15. FIG. 2 shows an enlarged view of the area of the main bearing 5 of the drive arrangement 1. The main bearing 5 with the bearing sleeve 17 defines the pivot axis A for the bearing support 16, which is fixedly connected to the first arm 3. On the bearing support 16, the actuating lever 15 is pivotally connected with the bearing support 16 in the area of a pivot axis B. The further pivot axes C, D relate to the spring 18 and the actuator 12. In an embodiment not shown in greater detail, the pivot axis B of the bearing support 16 coincides with the pivot axis A of the main bearing 5. The position of the pivot axis B in proximity to the main bearing 5 plays a minor role.

The actuating lever 15 is in contact with the bearing support 16 via two regions. The first contact involves the articulated connection in the pivot axis B. The second contact is between a catch 19 on the actuating lever 15 and a mounting 22 on the bearing support 16. As a result of this contact, the pivotal movement capability of the bearing support 16 is restricted in one direction, namely in the direction in which the spring force F1 acts.

In this exemplary embodiment, the mounting 22 is oriented parallel to a straight line G(AB) through the pivot axes A and B. Parallelism is not necessary required, however the position of the mounting 22 is such that the catch 19 can rest on it when the actuating lever 15 is pivoted.

A torque M(A)G acts on the arm 3 in the pivot axis A of the main bearing 5 due to the weight force G of the contacting device 2. This torque M(A)G is so great that the mounting 22 is pushed against catch 19.

A spacer 20 in the form of a screw bolt is arranged on the catch 19 to adjust the distance between the catch 19 and the mounting 22. When the distance is increased, the arm 3 can no longer pivot downwards to the extent as shown in FIG. 2. The spacer 20 can be used to determine the lower and upper end positions or the maximum lowered and raised positions.

When the piston rod 14 is retracted, the catch 19 forces the bearing support 16 into a counterclockwise rotational movement via the pressure on the mounting 22 and via the pull in the area of the pivot bearing B. The connection between the bearing support 16 and the bearing sleeve 17 causes the arm 3 to pivot counterclockwise and as a result the contacting device 2 is raised.

Figure 3:
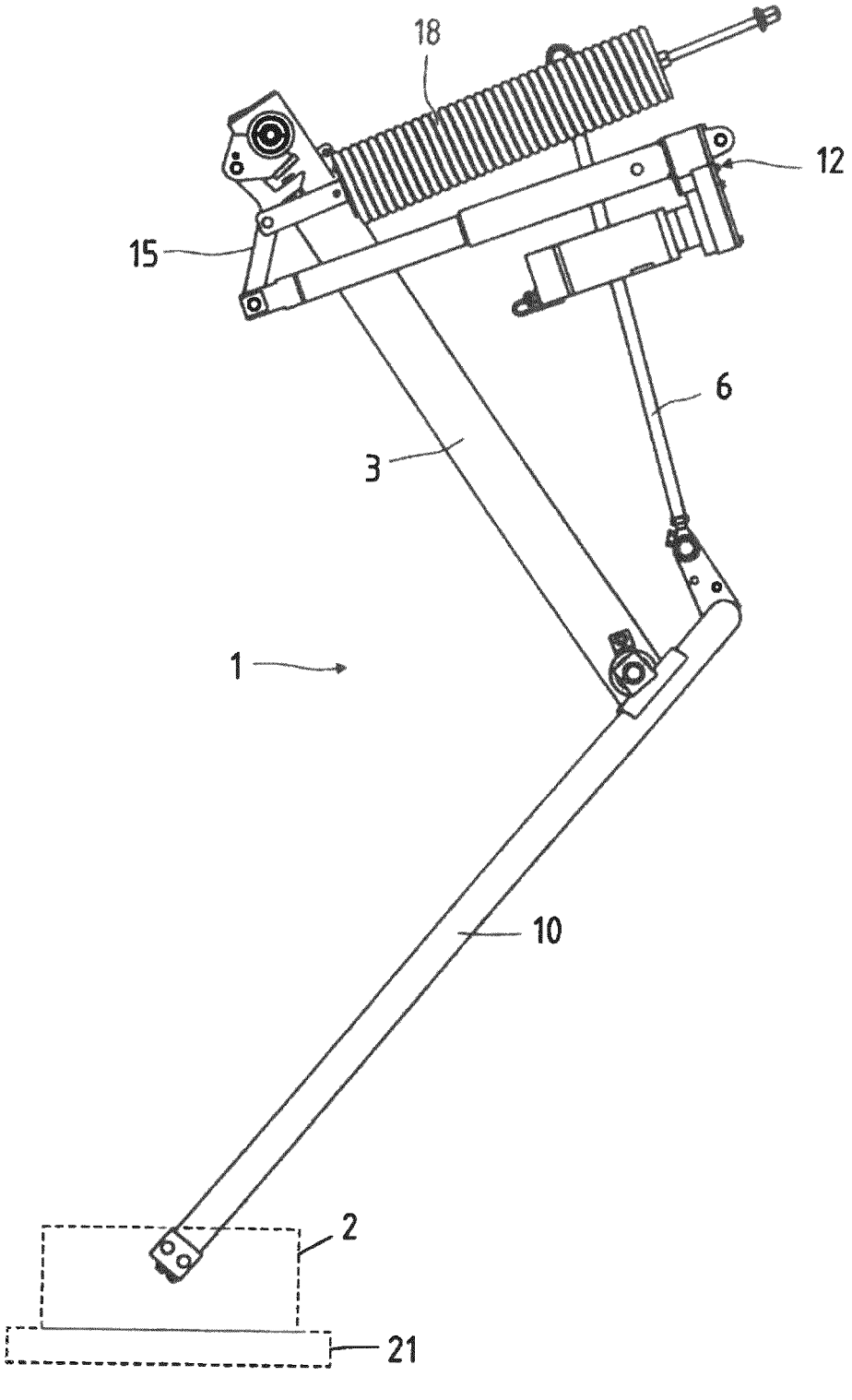
FIG. 3 the drive arrangement of FIG. 1 in a lowered position, with the actuating lever in a release position.

FIG. 3 shows the state of the drive arrangement 1 in the lowered position, but with the difference to FIG. 1, that the contacting device 2 rests against a counterpart 21. The contacting device 2 is therefore in a slightly raised position compared to FIG. 1. The third arm 10 is not pivoted quite as far as in the exemplary embodiment in FIG. 1. As a result, there are also different angular positions for the first arm 3 and the second arm 6. This in turn has an influence on the position of the actuating lever 15, as explained with reference to the enlarged illustration of FIG. 4.

Figure 4:
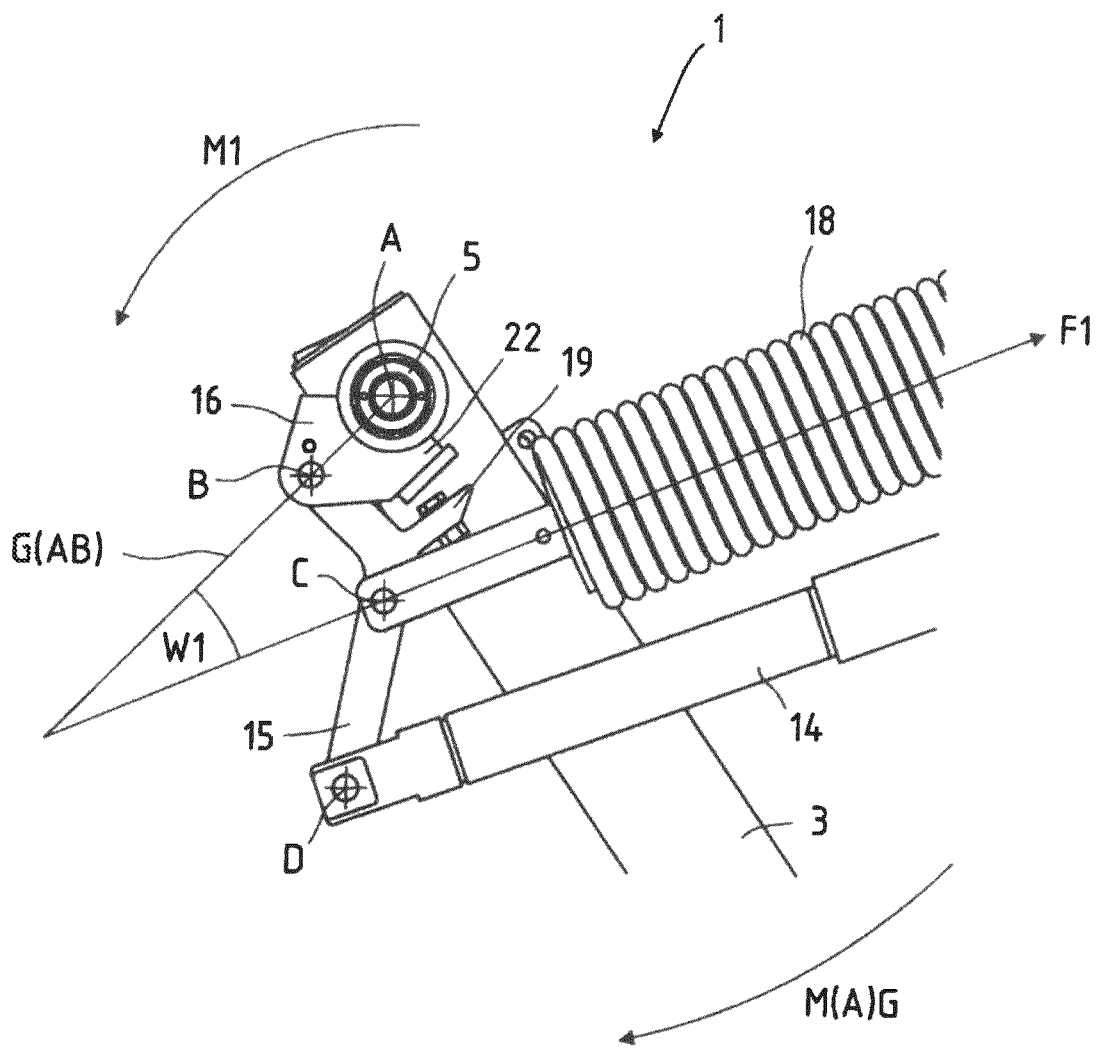
FIG. 4 a detail of FIG. 3.

Compared to FIG. 2, the piston rod 14 has not been extended any further. However, since the counterclockwise movement of arm 3 has also caused the bearing support 16 to pivot counterclockwise, the mounting 22 is no longer in contact with the catch 19. As a result, the straight line G(AB) between the two pivot bearings A and B is at a greater angle W1 in relation to the direction of the spring force F1 than in FIG. 1. However, the spring force F1 is not so great that the torque of the weight force M(A)G could be overcome to thereby lift the arm 3. This is due, i.a., to the very small distance between the pivot axes A and B and to the acute angle W1, which is less than 45°, The release position of the actuating lever 15, as illustrated in FIGS. 3 and 4, enables upon the counterpart 21 a contact force which is determined predominantly by the weight force.

Figure 5:
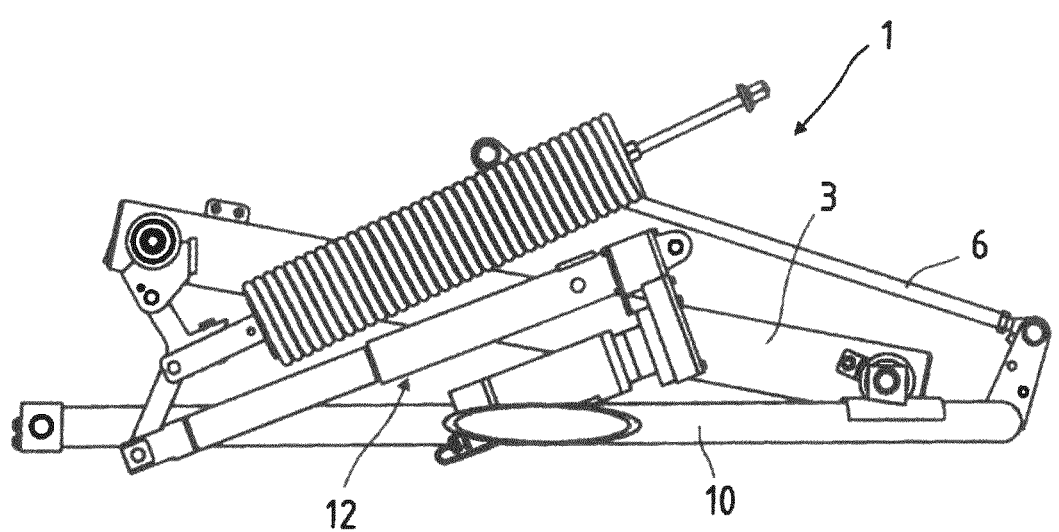
FIG. 5 the drive arrangement of FIGS. 1 to 4 in a higher position.
Figure 6:
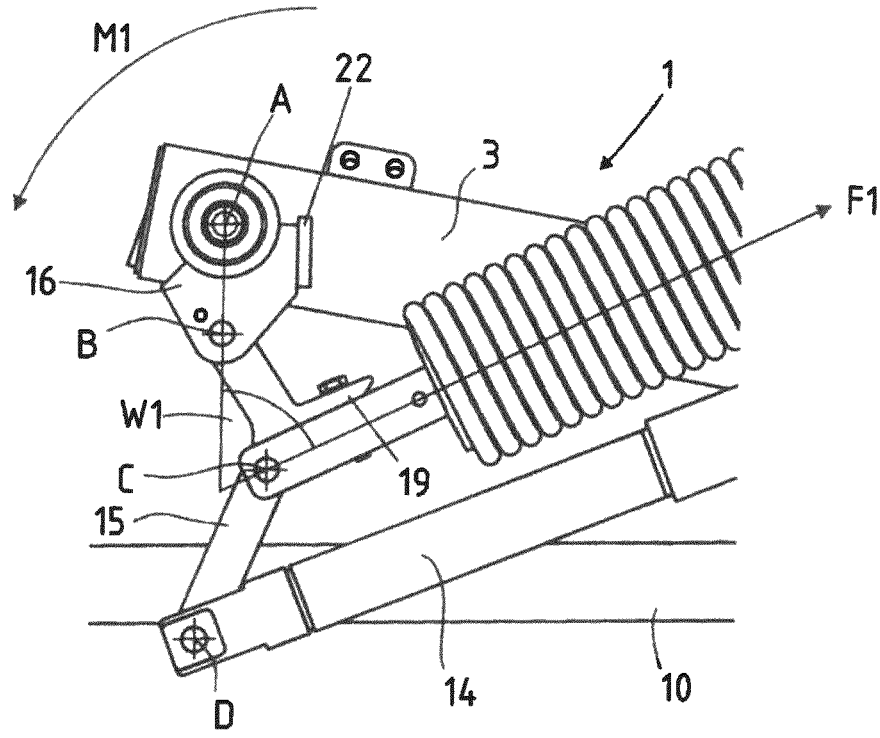
FIG. 6: a detail of FIG. 5.

FIGS. 5 and 6 show a situation in which the first arm 3 has been raised even further. The actuator 12 has not been extended or retracted any further, but has the same position as in FIG. 4, This illustration makes it clear that even when the contacting device 2 has been displaced almost completely upwards, it is still possible to generate a sufficient weight force G to ensure an electrical connection with a counterpart.

At the same time, these Figures can be used to explain the situation that can arise in the event of a failure of the supply energy for the actuator 12. In this case, the piston rod 14, as shown in the enlarged illustration of FIG. 6, is blocked. After the blockage has been released, the spring force F1 pulls the piston rod 14 back so that the angle W1 indicated in FIG. 6 is reduced to such an extent that the catch 19 on the actuating lever 15 is pivoted upwards in the drawing plane and comes to rest again upon the mounting 22 in order to maintain the arm 3 in the raised position.

Figure 7:
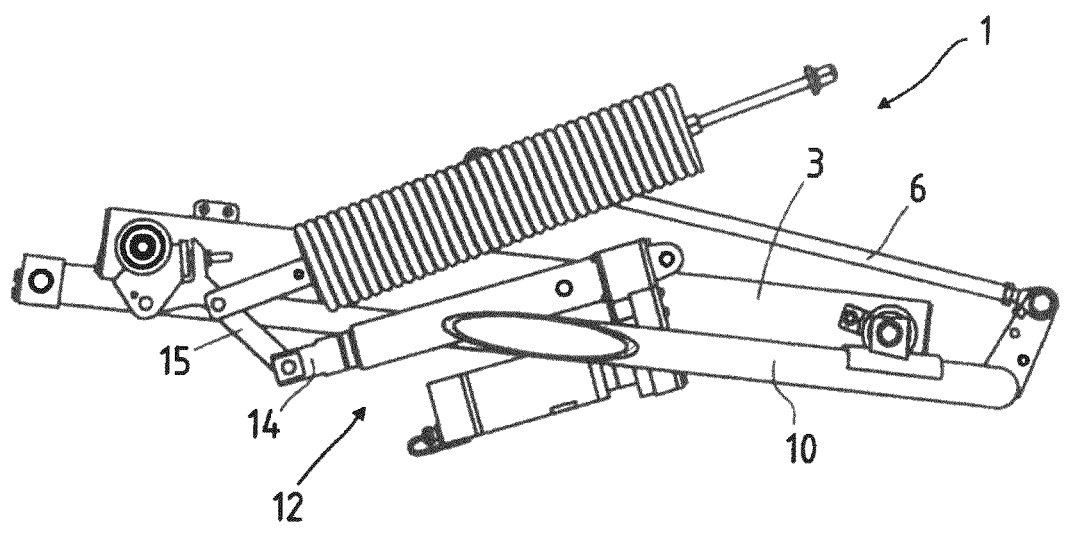
FIG. 7: the drive arrangement of FIGS. 1 to 6 in the raised position.
Figure 8:
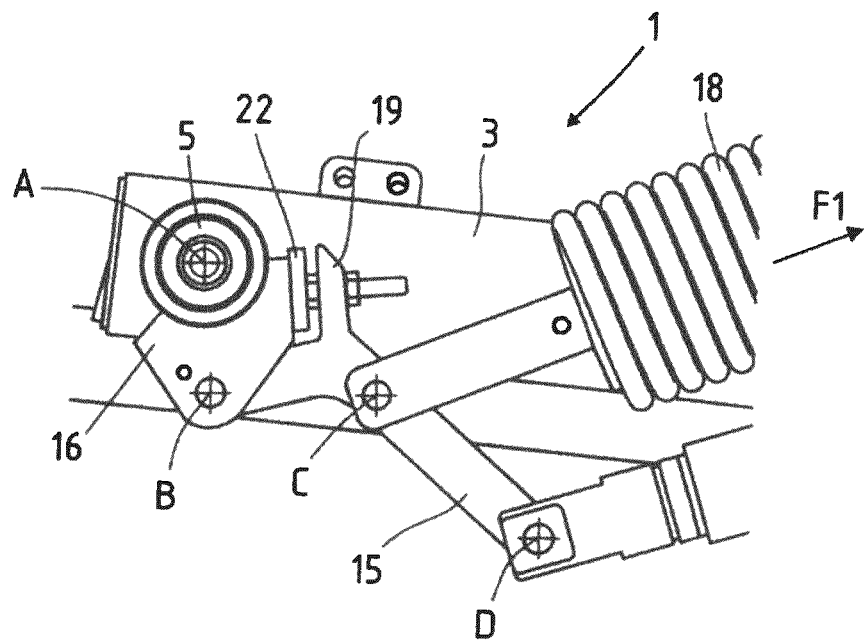
FIG. 8: a detail of FIG. 7.

FIGS. 7 and 8 finally show the fully raised position, in which the catch 19 again acts against the mounting 22. It is apparent that the piston rod 14 is now retracted, in the raised position, the entire drive arrangement 1 is extremely compact and provides a high clearance height below the drive arrangement 1.

The invention claimed is:

1. A drive arrangement for displacing a contacting device from a raised position to a lowered position, said drive arrangement comprising:
   a four-joint linkage comprising a first arm, a second arm, and a third arm, said third arm having a free end for attachment of the contacting device, said first, second and third arms connected to one another such as to displace the contacting device as the first, second and third arms pivot;
   an actuator; and
   an actuating lever connecting the actuator to the first arm and acted upon by a spring force which counteracts an actuating force applied by the actuator on the actuating lever, said actuating lever being pivotally connected to the first arm and supportable on the first arm via a catch when the first arm is displaced into a raised position and detachable from the first arm when the first arm is displaced into a lowered position, so that the actuating lever assumes a release position in the lowered position of the contacting device, with the contacting device maintained in the lowered position by its weight force.

2. The drive arrangement of claim 1, wherein the actuating force acts on the actuating lever at a distance from the spring force.

3. The drive arrangement of claim 1, wherein the catch is arranged on the actuating lever, and further comprising:
   a mounting associated with the catch for support; and
   an adjustable spacer arranged on the catch or on the mounting to adjust a distance between the catch and the mounting.

4. The drive arrangement of claim 1, wherein the first arm includes a first end distal from the third arm, said actuating lever being connected in an articulated manner to the first arm in an area of the first end.

5. The drive arrangement of claim 4, further comprising a bearing support arranged in the area of the first end of the first arm, said actuating lever being mounted on the bearing support in an articulated manner.

6. The drive arrangement of claim 5, further comprising a mounting associated with the catch for support, said mounting being arranged on the bearing support.

7. The drive arrangement of claim 5, wherein the actuating lever is connected to the actuator via an articulated connection, with the spring force between a pivot axis of the articulated connection of the actuating lever with the actuator and a pivot axis between the actuating lever and the bearing support acting on the actuating lever.

8. The drive arrangement of claim 1, wherein the actuator is designed as a linear drive.

9. The drive arrangement of claim 1, wherein the spring force is applied in a direction which is parallel to an effective direction of the actuator.

10. A contacting device, comprising a drive arrangement, said drive arrangement comprising a four-joint linkage comprising a first arm, a second arm, and a third arm, said third arm having a free end for attachment of the contacting device, said first, second and third arms connected to one another such as to displace the contacting device as the first, second and third arms pivot, an actuator, and an actuating lever connecting the actuator to the first arm and acted upon by a spring force which counteracts an actuating force applied by the actuator on the actuating lever, said actuating lever being pivotally connected to the first arm and supportable on the first arm via a catch when the first arm is displaced into a raised position and detachable from the first arm when the first arm is displaced into a lowered position, so that the actuating lever assumes a release position in the lowered position of the contacting device, with the contacting device maintained in the lowered position by its weight force.

11. The contacting device of claim 10, wherein the actuating force acts on the actuating lever at a distance from the spring force.

12. The contacting device of claim 10, wherein the catch is arranged on the actuating lever, said drive arrangement comprising a mounting associated with the catch for support; and an adjustable spacer arranged on the catch or on the mounting to adjust a distance between the catch and the mounting.

13. The contacting device of claim 10, wherein the first arm includes a first end distal from the third arm, said actuating lever being connected in an articulated manner to the first arm in an area of the first end.

14. The contacting device of claim 13, wherein the drive arrangement comprises a bearing support arranged in the area of the first end of the first arm, said actuating lever being mounted on the bearing support in an articulated manner.

15. The contacting device of claim 14, wherein the drive arrangement comprises a mounting associated with the catch for support, said mounting being arranged on the bearing support.

16. The contacting device of claim 14, wherein the actuating lever is connected to the actuator via an articulated connection, with the spring force between a pivot axis of the articulated connection of the actuating lever with the actuator and a pivot axis between the actuating lever and the bearing support acting on the actuating lever.

17. The contacting device of claim 10, wherein the actuator is designed as a linear drive.

18. The contacting device of claim 10, wherein the spring force is applied in a direction which is parallel to an effective direction of the actuator.

19. A method for establishing an electrically conductive contact between a contacting device and a counterpart disposed below the contacting device, said method comprising:

attaching the contacting device to a free end of a four-joint linkage;

connecting an actuator to the four-joint linkage via an actuating lever;

applying a spring force on the actuating lever to counteract an actuating force applied by the actuator on the actuating lever; and displacing the actuating lever into a release position, so that the counterpart is connected to the contacting device predominantly under the influence of a weight force of the contacting device and the four-joint linkage.

\* \* \* \* \*